Figure 2:
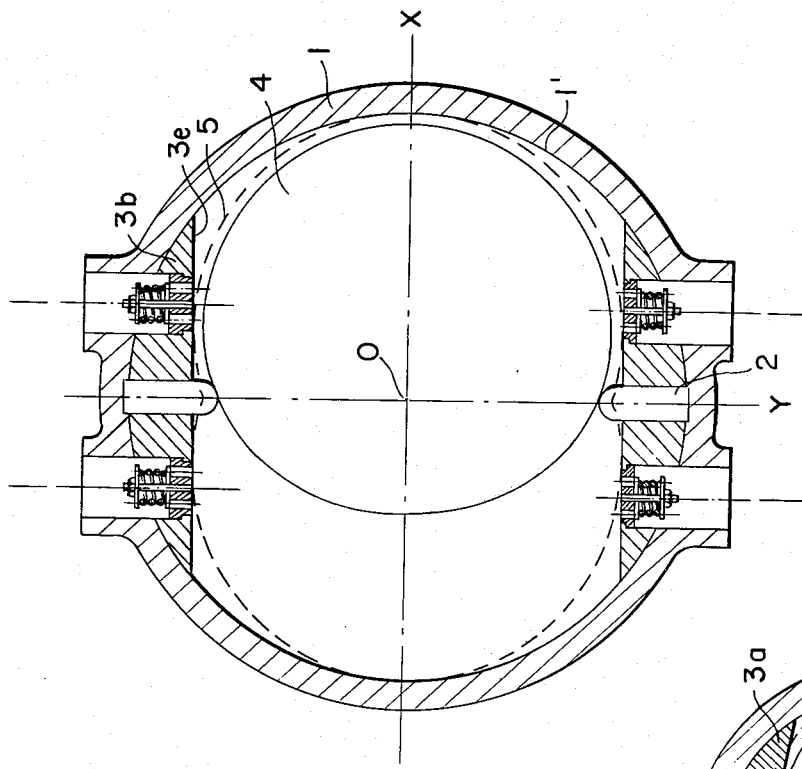

United States Patent [19]

Fritzsche et al.

[11] 3,909,164
[45] Sept. 30, 1975

[54] CASING FOR ROTARY PISTON ENGINES OF TROCHOIDAL CONSTRUCTION

[75] Inventors: Albert Fritzsche, Markdorf; Karl Jager, Immenstaad, both of Germany

[73] Assignee: Dornier GmbH, Germany

[22] Filed: Apr. 1, 1974

[21] Appl. No.: 456,884

[30] Foreign Application Priority Data
May 11, 1973 Germany............................ 2323789

[52] U.S. Cl. .............................. 418/61 B; 418/125
[51] Int. Cl.[2] ........................................... F04C 1/02
[58] Field of Search ...... 418/61 R, 61 A, 61 B, 125, 418/129, 168, 169, 170, 171

[56] References Cited
UNITED STATES PATENTS

| 582,389 | 5/1897 | Fleischer............................ 418/129 |
| 779,400 | 1/1905 | Estby ............................... 418/129 X |
| 3,483,694 | 12/1969 | Huber et al................... 418/61 A X |

FOREIGN PATENTS OR APPLICATIONS

| 611,485 | 8/1933 | Germany ............................ 418/169 |
| 839,193 | 6/1960 | United Kingdom................ 418/168 |

Primary Examiner—C. J. Husar
Assistant Examiner—Leonard Smith
Attorney, Agent, or Firm—James E. Bryan

[57] ABSTRACT

This invention relates to an improvement in a casing for a rotary piston engine havnig a trochoidal piston, wherein the inner wall of the casing constitutes the outer delimitation of the working chambers and encloses the envelope curve described by the piston during the rotation thereof, and including radial sealing strips at points of the envelope curve in proximity to the axle, the improvement comprising that the form of the inner wall of the casing is defined by a circle centrally enclosing the envelope curve, and filler segment means in said casing at said points of the envelope curve in proximity to the axle, said filler segment means receiving said radial sealing strips and having surfaces on both sides of said sealing strips which are tangential to the envelope curve.

4 Claims, 3 Drawing Figures

CASING FOR ROTARY PISTON ENGINES OF TROCHOIDAL CONSTRUCTION

The present invention relates to a casing for rotary piston engines with a trochoidal piston, particularly for rotary piston engines employed for the supply or feed of incompressible media. The working chamber delimitation of such rotary piston engines is presently customarily so effected that an envelope curve to the trochoid equidistant forms the cross-section of the respective working chamber. This envelope curve accordingly delimits in each case the working chambers up to the radial sealing strip, which in each case is positioned in the trochoid-producing point within the casing. The manufacture of such working chambers with envelope curves of the trochoid equidistant are possible on the one hand by means of copying devices and, on the other hand, with specific machining devices which have a considerable structural expense. The machining is effected with the aforementioned devices in a cutting manner.

These customary machining methods have, however, rather a negative effect, particularly in connection with the mass production of casings, with respect to the economic factors and the manufacturing techniques involved. This is apparent, on the one hand, from the relatively slow processing speeds which result from the kinematic construction of the specific machining devices and, on the other hand, because of the machining tools which have a relatively small diameter and whose radius must, for the interior machining, be smaller than that of the series of curves to be treated.

It is the object of the present invention to avoid the aforementioned manufacturing-technical difficulties in force or driving and processing machines which are charged with incompressible media, such as liquids, for example, and to provide an inner casing form which is simple to manufacture with conventional machining devices.

This object is obtained, in accordance with the present invention, in that the cross-section of the casing is determined by a circle which centrally encloses the envelope curve, and in that at the points in proximity to the axles filler segments which rest against the circular form are positioned in the casing, which receive the radial sealing strips and which are tangential with their surfaces positioned on both sides of the radial sealing strip, against the envelope curve.

According to a further embodiment of the present invention, the filler segments serve for receiving the radial sealing strips and/or for receiving valve means. The aforementioned construction of the inner casing form as a circular cross-section with filler segments positioned in the area of the trochoid-producing points is found to be advantageous from the point of view of the manufacture thereof since the cutting operation takes place by means of simple, conventional cutting or processing devices, such as a boring mill, honing devices, and the like. As a result, the machining periods are shortened and the specific expensive finishing devices eliminated.

Also, the manufacture of casings of different sizes is readily possible. Both the manufacture and the mounting of the filler segments is very simple, particularly in view of the fact that no particular requirements need be met or satisfied with regard to the surface quality and also the true measurement thereof. This particular construction of the inner casing form is suitable primarily for machines which work with incompressible media. The remaining undesirable spaces within the working chamber do not impair the effectiveness of the machine so that the manufacturing-technical and economic advantages during the housing manufacture are realized to the fullest effect.

Figure 3:
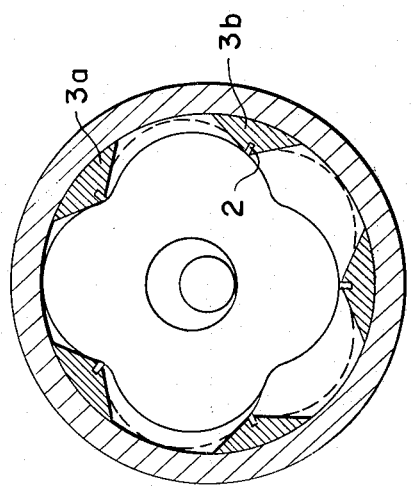
Figure 1:
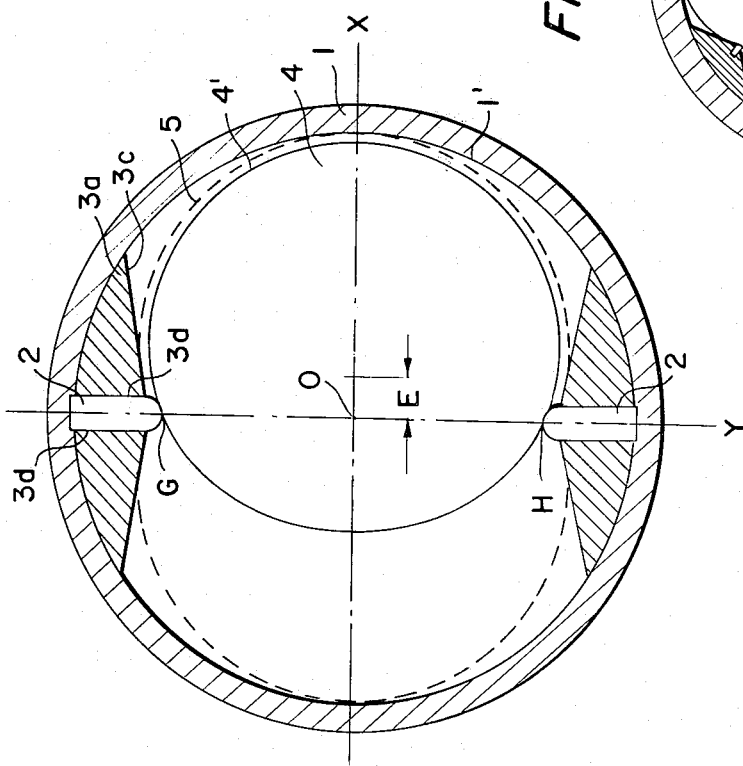

One embodiment of the casing as provided by the present invention will now be further described hereinafter with reference to the accompanying drawings, wherein FIG. 1 illustrates the casing construction with a V-surface filler segment in a cross-sectonal view thereof;

FIG. 2 illustrates the casing construction with a straight-surface filler segment, and FIG. 3 is a cross-sectional view through a casing with five working chambers.

Schematically shown in FIG. 1 is a casing 1 in which the filler segments 3a containing the radial sealing strips 2 are diametrically oppositely arranged. Further shown in this figure is a piston 4 with a trochoid-equidistant cross-sectional form, as well as the envelope 5 of the piston movement, indicated in a dash-dotted line. The radial sealing strips 2 are arranged on the y-axis so as to face each other, and engage the piston surface 4' sealingly in the line G and H. The radial sealing strips 2 are furthermore displaceably mounted in the filler segments 3a in the direction of the y-axis. This aforementioned arrangement of the radial sealing strips 2 in the filler segments 3a represents merely one embodiment and could quite readily be so modified that the radial sealing strips 2 are guided within the casing 1 itself, so that in each case the filler segments 3a are divided in the y-axis. The casing 1 has a circular inside cross section 1' which in each case is tangential to the envelope 5 in the axis of symmetry of the working chamber, in the present case or example in the x-axis. The center of the circular inside cross-section 1' of the casing 1 is positioned in the point of intersection O of the x and of the y-axis. The undesirable space thereby produced between the envelope 5 and the circular inside cross-section 1' is largely filled by means of the filler segments 3a. The filler segment 3a is so constructed that the delimitation of the filler segments 3a on the side of the housing corresponds to the housing form, in other words, represents a circular arc. The side of the filler segment 3a facing the piston 4 has two inclined surfaces 3c which extend under an obtuse angle in a V-like manner from the radial sealing strip 2 and which are in each case tangential to the envelope 5. The radial sealing strip 2 is mounted in a groove 3d within the filler segment 3a.

FIG. 2 shows the same construction of the casing 1 as illustrated in FIG. 1, with the exception of the filler segments 3b. The filler segment 3b has an outer form or contour corresponding to the circular inner casing space and, on the side of the piston, is provided with a straight surface 3e which is twice tangential at the envelope 5. The radial sealing strip 2 is mounted in the groove 3d in the filler segment 3b. Furthermore, it is possible to so construct the filler segments 3a and 3b that they will serve for receiving inlet and outlet valves, which has an advantageous effect particularly for an economical assembly or mounting of casings. The remaining undesirable spaces will not have an adverse effect in machines designed or intended for incompressible media, such as liquids. The use of filler segments 3a and 3b for the construction of inner casing forms may be applied quite readily without difficulty to any casings of rotary piston engines with trochoidal pistons and outer envelope curve.

A corresponding embodiment is shown in FIG. 3. The inner casing form or shape has therein five working chambers which in each case are separated from each other in the area of the radial sealing strips 2 by means of the filler segments 3a and 3b. It is readily apparent from these examples as indicated herein that a large spectrum of inner casing forms or shapes can be manufactured in an economically favorable manner and also from the standpoint of manufacturing techniques, which is of significance particularly in the mass production of casings.

It will be obvious to those skilled in the art that many modifications may be made within the scope of the present invention without departing from the spirit thereof, and the invention includes all such modifications.

What is claimed is:

1. In a casing for a rotary piston engine having a trochoidal piston adapted to rotate in a planetary motion around a central axle in the casing, wherein the inner wall of the casing constitutes the outer delimitation of the working chambers and encloses the envelope curve described by the piston during the rotation thereof, and including radial sealing strips at points of the envelope curve in proximity to the axle, the improvement which comprises that the form of the inner wall of the casing is defined by a circle centrally enclosing the envelope curve, and filler segment means in said casing at said points of the envelope curve in proximity to the axle, said filler segment means receiving said radial sealing strips and having surfaces on both sides of said sealing strips which are tangential to the envelope curve.

2. A casing according to claim 1 in which the piston-side delimitation of said filler segment means has two planar surfaces, extending from the radial sealing strip, which are tangential to the envelope curve.

3. A casing according to claim 1 in which the piston-side delimitation of said filler segment means has a planar surface which is tangential to the envelope curve on both sides of the radial sealing strip.

4. A casing according to claim 1 including valve means in said filler segment means.

* * * * *